United States Patent [19]
Lorenzo et al.

[11] Patent Number: 4,787,691
[45] Date of Patent: Nov. 29, 1988

[54] ELECTRO-OPTICAL SILICON DEVICES

[75] Inventors: Joseph P. Lorenzo, Stow; Richard A. Soref, Newton Centre, both of Mass.

[73] Assignee: The United States of America as represented by the Secretary of the Air Force, Washington, D.C.

[21] Appl. No.: 36,822

[22] Filed: Mar. 26, 1987

[51] Int. Cl.⁴ .................. G02B 6/10; G02B 6/00; H01L 29/42; H01L 29/06
[52] U.S. Cl. .................. 350/96.14; 350/96.12; 357/56; 357/19
[58] Field of Search .................. 357/13, 56, 19; 350/96.10, 96.11, 96.12, 96.13, 96.14

[56] References Cited

U.S. PATENT DOCUMENTS

| | | | |
|---|---|---|---|
| 3,896,305 | 7/1975 | Ostrowsky et al. | 350/96.11 X |
| 4,002,512 | 1/1977 | Lim | 148/187 |
| 4,091,408 | 5/1978 | Lee et al. | 357/13 X |
| 4,329,016 | 5/1982 | Chen | 350/96.12 |
| 4,420,873 | 12/1983 | Leonberger et al. | 350/96.12 X |
| 4,426,440 | 1/1984 | Thompson | 430/321 |
| 4,439,004 | 3/1984 | Hunsperger et al. | 350/96.12 |
| 4,472,020 | 9/1984 | Evanchuk | 350/96.12 |
| 4,649,624 | 3/1987 | Reedy | 29/571 |
| 4,693,546 | 11/1987 | Lorenzo et al. | 350/96.14 |
| 4,693,547 | 11/1987 | Soref et al. | 350/96.14 X |

OTHER PUBLICATIONS

"The Route to 3-D Chips" By Douglas, High Technology, Sep. 1983 (pp. 55-59).
"Multimode 2×2 Optical Crossbar Switch" by Electronics Letters, 27th Apr. 1978, vol. 14, No. 9, pp. 283-284.

Primary Examiner—William L. Sikes
Assistant Examiner—Akm E. Ullah
Attorney, Agent, or Firm—Donald J. Singer; Jacob N. Erlich; Jules J. Morris

[57] ABSTRACT

All silicon electrooptic devices for modulating and switching of guided light have been developed using the silicon-on-insulator approach. Generally, p-n junctions are formed in a silicon waveguide to selectively modulate and direct light by carrier refraction. An electrooptic phase modulator and several 2×2 electrooptic switches are described. The devices are particularly useful for manipulating light signals in the 1.3-1.6 micron range.

19 Claims, 8 Drawing Sheets

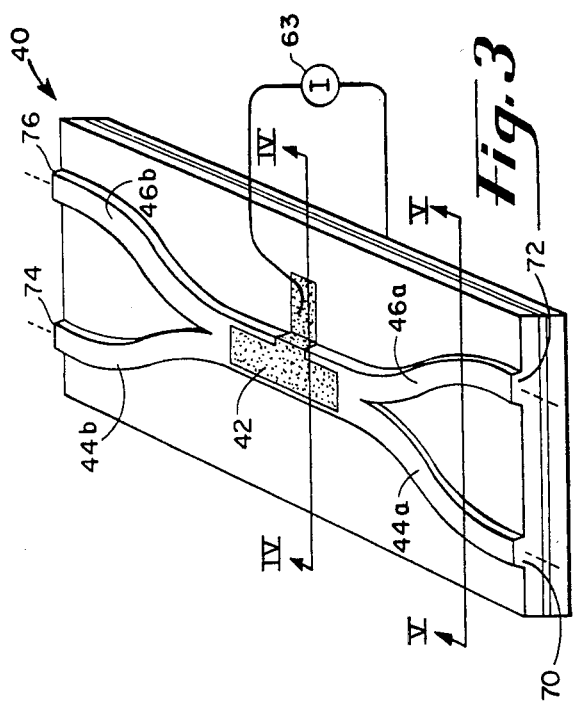
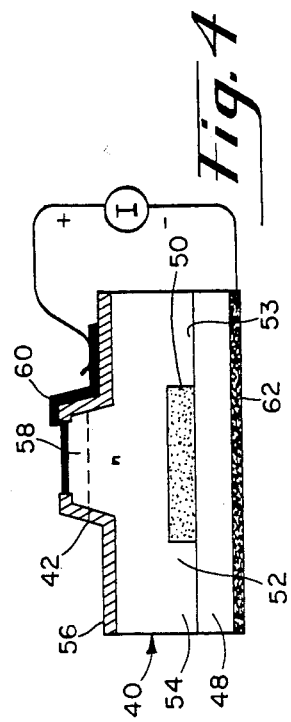
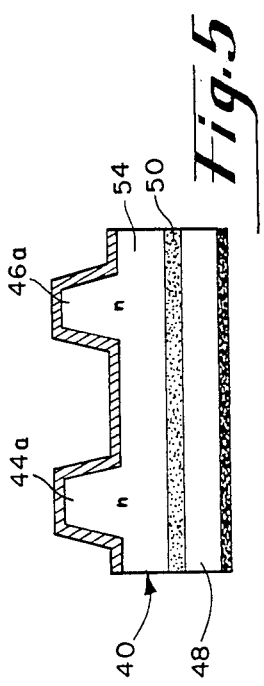
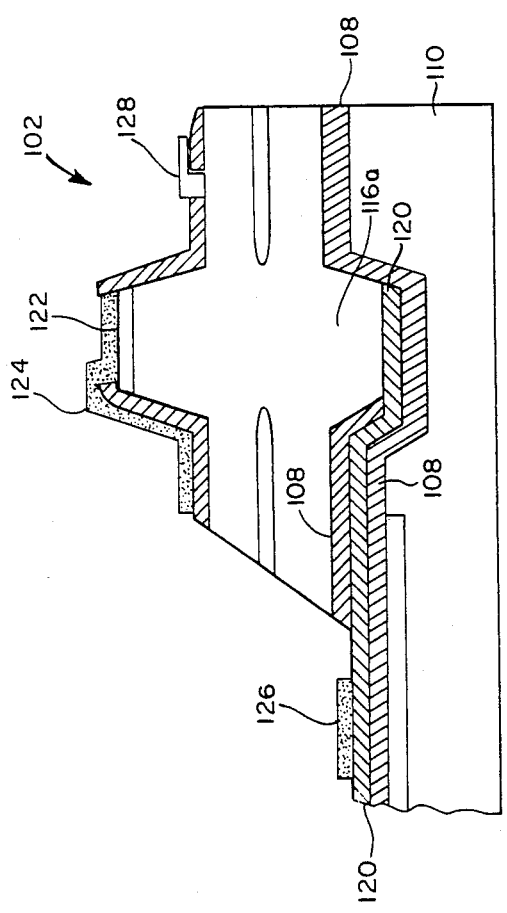
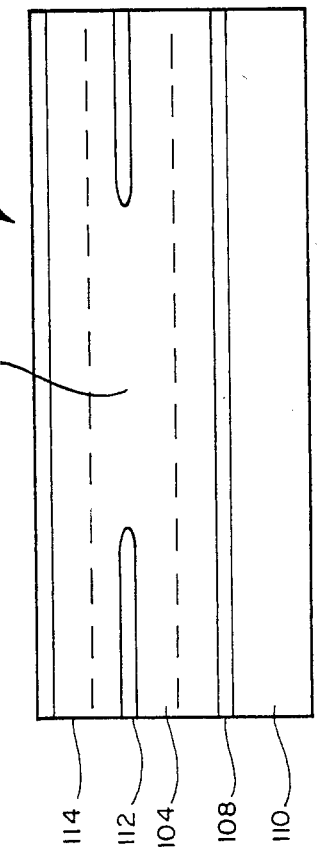

4,787,691

ELECTRO-OPTICAL SILICON DEVICES

STATEMENT OF GOVERNMENT INTEREST

The invention described herein may be manufactured and used by or for the Government for governmental purposes without the payment of any royalty thereon.

BACKGROUND OF THE INVENTION

The invention is generally related to integrated optical circuits and components making up such circuits and is more particularly related to active electro-optical silicon devices.

The recent development of low loss single mode optical fibers with low dispersion at the 1.3 and 1.6 micron wavelengths has focused attention on long wave integrated optical circuits and optical systems that couple to such fibers. Such optical circuits and systems are useful in telecommunication, data communication, optical signal processing, optical interconnection, optical sensing, and microwave antenna control applications. Semiconductor guided wave circuits are of special interest because they could, in principle, provide electrooptic integration; that is, the monolithic integration of optical guided wave components with electronic circuits and electro-optical components on a single chip. This application is particularly related to electro-optical components for integration on silicon chips.

The fundamental building blocks of such guided wave circuits are the channel waveguides which are used to make optical components and the interconnects therebetween. It is essential that optical propagation losses be kept to a minimum to allow multiple guided wave components to be cascaded on one wafer (such as in a switching network) without incurring a significant loss penalty. Therefore, an important need is to provide channel waveguides with small physical size so that the waveguides may be densely packed onto the chip. It is also important to provide a fabrication technique that is relatively simple and is capable of fabricating a wide variety of channel waveguide shapes. We have disclosed just such a technique for fabricating a wide variety of channel waveguide shapes in our related application Ser. No. 928,349 filed on Nov. 10, 1986 by Joseph P. Lorenzo and Richard A. Soref. The application is entitled "Method of Fabricating Low Loss Crystalline Silicon Waveguides" and is herein incorporated by reference to this application.

Two prior art waveguide fabrication techniques have been used with some success to fabricate some optical components and waveguides, heteroepitaxy of III-V semiconductors and homoepitaxy of silicon-on-silicon.

Prior art fabrication of III-V semiconductor guided wave components for the 1.3 to 1.6 microns wavelengths suffer from the complexity of using binary, ternary, or quaternary alloy compositions of various materials, and the problems which arise from heteroepitaxy of different volatile materials upon each other. As a result these costly techniques are extremely sophisticated and high quality components are difficult to produce. Further, it is also difficult to add conventional electrical elements to devices so constructed without disrupting the optical structures.

The use of crystalline silicon alleviates most difficulties because the waveguide core uses only an elemental group IV material and all related processing is both highly developed and simple compared to processing of III-V material. Further, use of silicon for electro-optic components facilitates the arrangement of electro-optical components and common silicon electronic components on a single chip.

Epitaxial silicon-on-silicon waveguides and components have been previously constructed. In order to construct such devices a lightly doped silicon layer is grown on a more heavily doped substrate. The refractive index of the substrate is typically 0.01 lower than the index of the epitaxial guiding layer. The problem with such prior art devices is that light tends to leak or "tail" evanescently into the heavily doped substrate because the refractive index difference is insufficient to offer tight mode confinement. Moreover the substrate tends to yield high optical losses due to a large concentration of free carriers therein. As a result, the efficiency of silicon-on-silicon homojunction devices is in the range of 10-15 dB/cm. Losses in this range are not acceptable for medium scale integration of electro-optical components. Also such silicon-on-silicon components are relatively large because it is impractical to shrink the waveguide core area to one micron or less due to losses which result from the extremely high doping of the silicon waveguide "cladding".

In view of the above, a need exists for improved electro-optical components which are not subject to the loss, quality and size limitations associated with prior art devices. A need also exists for improved silicon devices that will simplify the integration of electro-optical and electronic devices on an integrated chip. These silicon devices should be relatively inexpensive to produce and suitable for straightforward and consistent quality manufacture.

SUMMARY OF THE INVENTION

The present invention overcomes the problems encountered in the past and as set forth in detail above by providing silicon-on-insulator devices for optical switching and modulation which offer tight mode confinement and reduced size. All of the devices provide for a crystalline silicon waveguide positioned on a dielectric layer. The waveguide of each device comprises an active area having a p-n junction formed within the silicon waveguide. More specifically, an electro-optical modulator and several electro-optical switches have been disclosed which are suitable for manufacture by the processes discussed in related application Ser. No. 938,349, referenced above.

A preferred embodiment of the invention comprises an electro-optical phase modulator. The phase modulator comprises a silicon substrate upon which is deposited an insulating dielectric layer. The dielectric layer serves to confine directed light in the waveguide. A first doped silicon layer is positioned upon the dielectric layer on the silicon substrate. In a preferred embodiment of the phase modulator the first doped silicon layer is formed into a waveguide for the transmission of light. A second differently doped silicon layer is positioned in the waveguide and an Ohmic electric contact is connected to it. Another Ohmic electrical contact is connected to the first silicon layer so that connection of the two electrical contacts to an electrical voltage source causes the first and second silicon layers to interact and change the phase of light transmitted through the waveguide. The dielectric layer is interrupted away from the vicinity of the waveguide in order to facilitate operation of the modulator by allowing electric current to flow between the electric contact and the first doped silicon layer.

In the preferred embodiment of the phase modulator the second layer is p+ doped while the first silicon layer is n doped. In one embodiment of the electrooptic phase modulator an initial n+ doped silicon layer forms the lower substrate up to the dielectric layer to facilitate efficient operation.

Another embodiment of the invention comprises an electrooptic switch. The electroopic switch preferably comprises a crystalline silicon substrate upon which is deposited a dielectric layer. A crystalline silicon layer is positioned upon the dielectic layer and forms two branching waveguides having a common active area. At the active area the crystalline silicon layer comprises regions of differently doped material.

A first Ohmic contact is electrically connected to an n-doped region in the waveguide common area while a second Ohmic contact is electrically connected to a p doped region also located in the common area. When the first and second electric contacts are connected to a current source, the doped regions of the common area form a p-n junction which is used to change the refractive index of the waveguide common area. Changes in the refractive index variably divide light signals traveling through the common area between the independent waveguides that diverge from the common area.

In the preferred embodiment of the invention, the crystalline silicon layer comprises an n doped region and a p doped region. The p doped region preferably forms the top-most portion of the waveguide while the n doped region forms the remainder of the silicon layer in the common area. In one preferred embodiment of the electrooptic switch, the first and second contacts comprise surface mounted electrodes that are mounted to the p and the n material, respectively.

In another preferred embodiment of the electrooptic switch the dielectric layer is interrupted at a location removed from the waveguide common area. This permits electric current to flow between the substrate and the crystalline silicon layer in order to allow connection of the second electrical contact directly to the substrate.

Yet another embodiment of the invention comprises a vertically integrated electrooptic switch having a first dielectric layer deposited on a substrate and a first waveguide shaped crystalline silicon layer deposited on the first dielectric layer. A second dielectric layer is deposited upon the first crystalline silicon layer and a second silicon layer is deposited on the second dielectric layer. The second silicon layer forms a second waveguide thus providing a second discrete waveguide vertically removed from the first waveguide. This preferred embodiment of the electrooptic switch further comprises a crossover area where the second waveguide passes over the first waveguide. In order to allow light to pass from one waveguide to the other, the second dielectric layer is deleted in the vicinity of the crossover area.

In the preferred embodiment of the vertically integrated electrooptic switch, each waveguide in the crossover area has a p doped section at its base and an electric contact connected thereto. The center section of the waveguides is preferably n doped and is also connected to an electric contact. The electrooptic switch operates by selectively energizing the p doped layers and the n doped layer to variably divide the optical signal between the two waveguides. Another preferred embodiment comprises an electrooptic switch in which a p+ doped region is centered at the intersection of two waveguides. The p+ region is electrically connected such that under forward bias holes or electrons are injected in the central region of the intersection. These injected carriers form a thin vertical reflfective wall from top to bottom of the intersection and act as a variable mirror to incoming optical signals. In the "on" state optical signals are reflected or diverted to a cross channel. In the "off" state optical signals pass straight through the intersection.

In view of the above, it is an object of this invention to provide a variety of electrooptical silicon devices for switching and modulating optical signals.

It is a further object of this invention to provide inexpensive, high quality devices that are suitable for use in integrated circuits which include silicon electronic devices.

It is yet another object of the invention to provide electrooptical devices which are highly efficient at 1.3 and 1.6 micron wavelengths and have optical propagation losses of less than 1 dB/cm.

BRIEF DESCRIPTION OF THE DRAWINGS

The foregoing objects and other advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

FIG. 3 is a perspective representation of an electrooptic switch;

FIG. 4 is a cross section of the electrooptic switch taken across lines IV—IV of FIG. 3;

FIG. 5 is a cross section of the electrooptic switch taken along lines V—V of FIG. 3;

FIG. 9 is a cross section of the electrooptic switch of FIG. 8 taken along line IX—IX of FIG. 8;

FIG. 10 is a cross section of the electrooptic switch of FIG. 8 taken along line X—X of FIG. 8;

DETAILED DESCRIPTION OF THE INVENTION

Long wavelength integrated optics is an emerging technology can be based upon crystalline silicon. This technology relies on low loss propagation of 1.3 and 1.55 micron wavelength light through crystalline silicon channel waveguides as disclosed in U.S. patent application Ser. No. 928,349 filed Nov. 10, 1986 by Joseph P. Lorenzo and Richard A. Soref, entitled "Method of Fabricating Low Loss Crystalline Silicon Waveguides."

Disclosed herein are crystalline silicon electrooptic modulators and switches for use in crystalline silicon technology optics. Crystalline silicon exhibits two electro-optical effects that are suitable for application in guided wave modulators and electro-optical switches. These effects are electro-refraction and free carrier refraction (plasma dispersion). Dispersion is controlled by electrical injection or electrical depletion of charge carriers in the active area of a guided wave modulator or switch. The theoretical basis for these effects can be calculated, and from an investigation of these effects, carrier refraction was selected for control of the devices presented below.

The theoretical basis for the devices described below can be expressed by a formula that governs the refractive index perturbation for optical modulation ($\Delta n$) that arises from a change in the optical absorption spectrum ($\Delta \alpha$). The optical modulations, that arise physically from changes in the optical absorption spectrum, produces as a principle effect in crytalline silicon a change in the velocity of light passing through the silicon as charge carriers are injected or depleted.

The appropriate relationship is governed by the Kramers-Kronig dispersion relation that governs the coupling between optical modulator ($\Delta n$) and the change in optical absorption spectra ($\Delta \alpha$). It can be expressed as follows:

$$\Delta n(\omega) = \frac{c}{\pi} P \frac{(\Delta \alpha') d\omega'}{\omega'^2 - \omega^2} \quad (1)$$

where $h\omega$ is the photon energy, and $\Delta \alpha (\omega, E) = \alpha(\omega, E) - \alpha(\omega, O)$ or $\Delta \alpha (\omega, \Delta N) = \alpha(\omega, \Delta N) - \alpha(\omega, O)$ Here E is the applied electric field and $\Delta N$ is the change in free carrier concentration within the crystalline silicon.

Donor and acceptor impurities in crystalline silicon are almost fully ionized at room temperature yielding numerous free carriers. This impurity doping modifies the optical absorption spectrum of silicon. It is therefore possible to calculate how the injection or depletion of carriers by electrical means affects the spectrum. In order to proceed with this calculation it is assumed that an equivalence exists between doping and injection as far as optical consequences are concerned. A change in carrier concentration of $\Delta N$ is assued to change $\alpha$ in the same way as the addition of $N_c$ impurities per cubic centimeter.

Figure 2A:
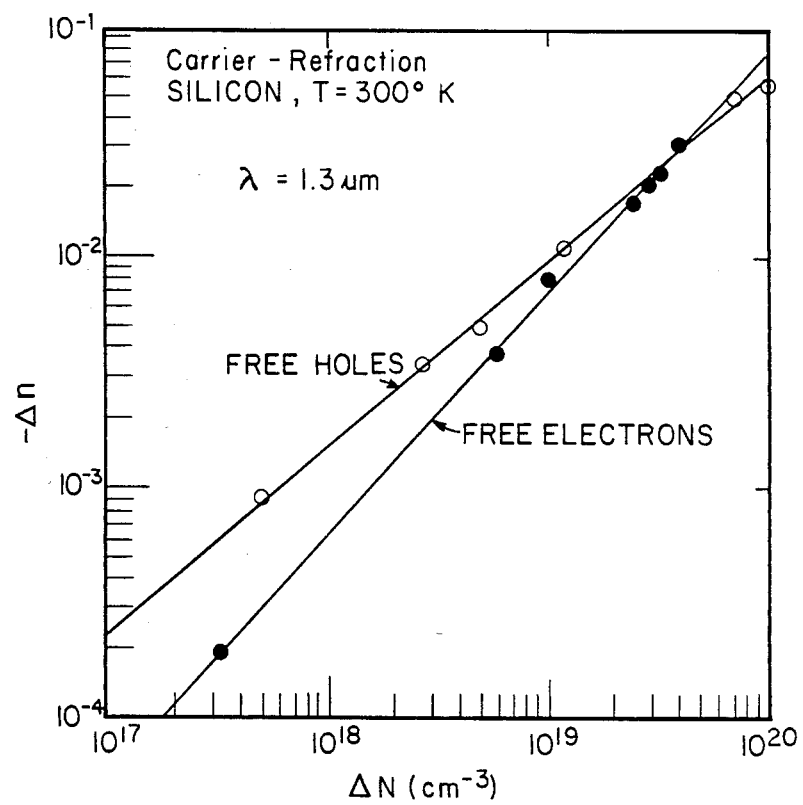
FIG. 2A a graph of refractive index ($\Delta n$) change in crystalline silicon, produced by changes in carrier concentration ($\Delta N$)

Experimental data on the influence of n-type and p-type doping of silicon over the visible, near infrared and far infrared regions are given by P. E. Schmid, "Optical Absorption in Heavily Doped Silicon", *Physical Review B*, Vol. 23, p 5531 (1981) and W. Spitzer and H. Y. Fan, "Infrared Absorption in n-type Silicon", Physical Review, vol. 108, p 268 (1957). In order to evaulate the integral of equation (1) numerically, the spectrum of undoped silicon as given by W. C. Dash and R. Newman ("Intrinsic Optical Absorption in Single-Crystal Germanium and Silicon", *Physical Review*, vol. 99, pp 1151-1155 (1955)) is subtracted from the n and p spectral curves cited above and entered into the $\Delta \alpha$ variable in the numerator of equation (1). The range of integration was from $h\omega = 0.001$ to 2.8 eV (the range over which $\Delta \alpha$ is finite). The resulting $\Delta n (\omega)$ is calculated for $h\omega = 1.23$ to 2.46 eV for six different donor concentrations and for seven different acceptor concentrations in the range of $10^{17}$ to $10^{20}$ cm$^{-3}$. Next, $\Delta n$ is plotted as a function of free carrier concentration at $\lambda = 1.3$ microns and at $\lambda = 1.55$ microns, since these are the important single mode fiber optic wavelengths. The 1.3 micron carrier refraction result for silicon is shown in the graph of FIG. 2a. FIG. 2a compares the change in impurities per cubic centimeter ($\Delta N$) with change in optical modulation of $\Delta n$.

The carrier refraction for silicon, shown in FIG. 2A, is a function of carrier density over the change in doping range from $10^{17}$ to $10^{20}$ cm$^{-3}$. Carrier induced index perturbations in silicon are large by comparison to those found in semiconductor Pockels-effect materials. For example, an electric field of $10^5$ volts per centimeter applied to high resistivity gallium arsenide will produce $\Delta n$ (Pockels) of approximately $+4 \times 10^{-4}$ while an injection of $10^{18}$ holes per cubic centimeter into n-type Si from adequately doped p-type Si will produce $\Delta n = -1.5 \times 10^{-3}$.

Figure 2B:
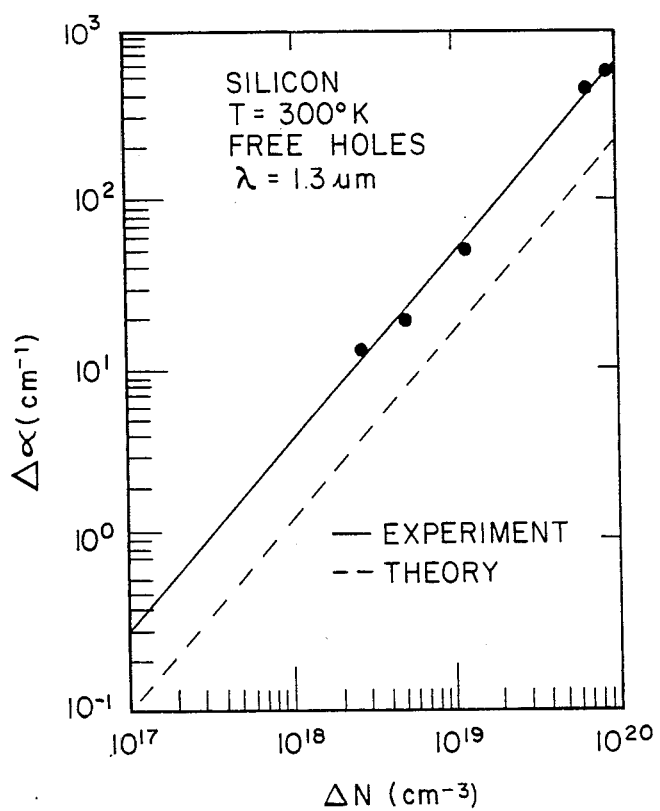
FIG. 2B is a graph of added optical absorption ($\Delta \alpha$) in crystalline silicon produced by increases in carrier concentration ($\Delta N$)

It is also important to examine the optical absorption that accompanies the phase modulation when free carriers are depleted or injected into silicon. The graph of FIG. 2B shows the added absorption in silicon vs. carrier concentration over $10^{17}$ to $10^{20}$ cm$^{-3}$. Crystalline silicon has relatively low losses at the low end of the concentration range but has high losses for concentrations greater than $10^{19}$ cm$^{-3}$.

Figure 2C:
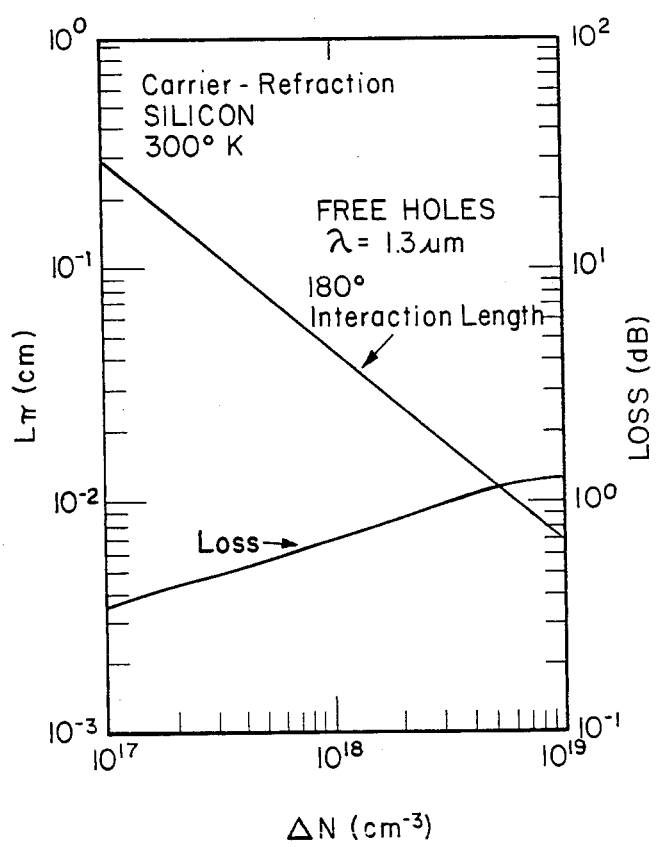
FIG. 2C is a graph comparing waveguide length ($L_{90}$) with optical phase shift as well as optical insertion loss as a function of depleted carrier density ($\Delta N$)

The trade-off between carrier controlled optical phase shift and optical attenuation in crystalline silicon is illustrated in FIG. 2C where the interaction length ($L_{90}$) required for a one radian phase shift (and the optical insertion loss due to the $L_{90}$) is plotted as function of carrier density. The required lengths are generally less than 1 millimeter and the throughput loss is less than 1 dB.

The carrier refraction effect can therefore be used effectively in a variety of silicon guided wave devices. Thus information can be impressed electrically on a guided light beam with one or more p-n junctions. A first illustration of this technique is shown in FIG. 1.

Figure 1:
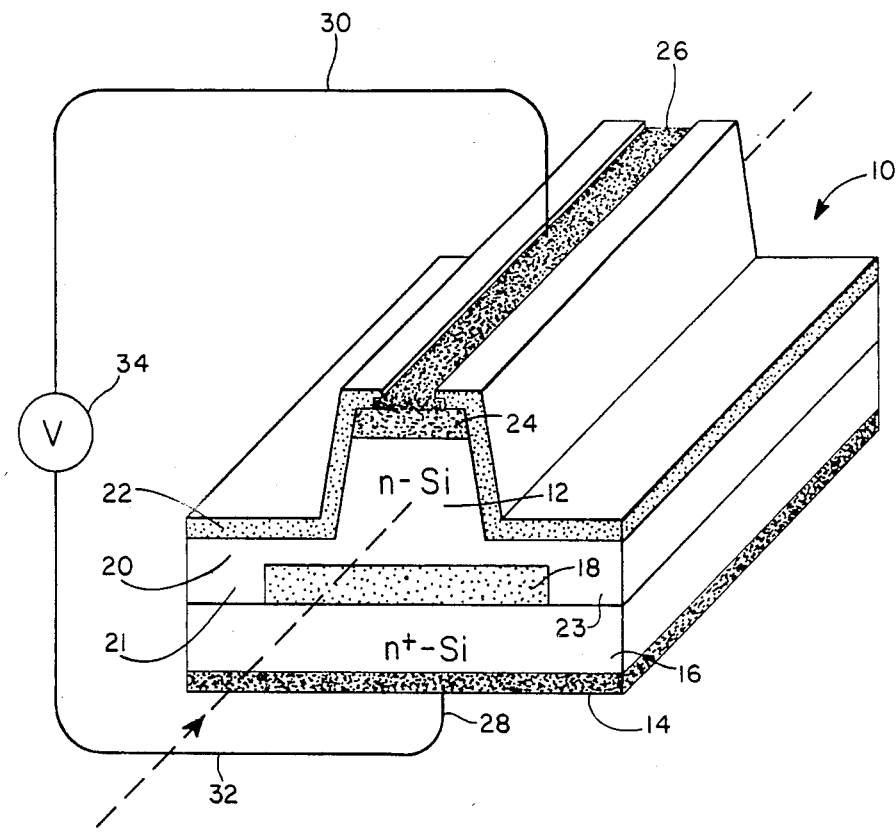
FIG. 1 is a perspective representation of an electrooptic phase modulator.

FIG. 1 discloses an electrooptic phase modulator 10 manufactured by the silicon-on-insulator approach and having a silicon rib waveguide 12. The modulator 10 is constructed on a substrate base 14. An n+ doped influx silicon substrate 16 includes an Ohmic contact 14 and has a low index dielectric layer (SiO$_2$) 18 formed upon it. An n-type silicon layer 20 is grown/deposited upon the dielectric cladding 18 and formed into the waveguide 12 by etching.

The dielectric layer 18 is maintained underneath the waveguide 12 in order to prevent tailing of optical signals into the silicon substrate. The silicon oxide dielectric stripe is generally greater than 0.5 microns thick in order to prevent significant penetration of signals through the dielectric and into the lossy substrate. The large silicon on insulator refractive index step serves the important function of confining the light tightly to the silicon waveguide core and thus reducing optical propagation loss in the channel. This allows submicron lateral dimensions for the waveguide which are beneficial for modulation and switching because these dimensions are comparable to depletion layer thicknesses. On top of the channel, a silicon oxide passivating layer 22 represents the upper cladding which also passivates the edges of the p-n junction.

A p+ doped region 24 is formed at the very top of the waveguide 12 and is connected to an electrical contact 26. The substrate 16 is also connected to an electrical contact 28. The dielectric layer is deleted well away from optical waveguide 12 at areas 21 and 23 in order to allow for electric current flow between silicon n/n+-type layers 20 and 16. The electrical contacts each have leads 30, 32 which are connected to a voltage source 34. The voltage source provides a forward or reverse bias between the n-doped and p-doped regions of the waveguide in order to modulate the phase of optic signals in the waveguide 12 according to the injection/depletion theory of operation described above.

The electrooptic phase modulator 10 is therefore a p-n junction device in which long wave 1.3 or 1.55 micron wavelength light is confined within an n type single mode silicon rib waveguide 12 which has an indiffused p+ region at the top of the channel. This places the p+-n junction that operates on the guided light signal at about 0.3 microns below the top surface.

The electrooptic phase modulator is polarization independent since the TE and TM optical modes are affected equally by the carrier refraction effect. The modulator can be designed with an optimum concentration of donor impurities in the guiding region. The optimum concentration will depend however upon whether the device is operated in the injection mode (with forward bias control or in depletion mode, with reverse bias control). The doping should be heavier in the depletion mode, because the goal in that case is to extract numerous majority carriers from the ambient material. Note that majority carrier depletion increases the refractive index of the rib while minority carrier injection increases the refractive index.

FIG. 3 discloses a silicon electrooptic guided wave switch 40. The switch has an integral active region, or common area, 42 at the intersection of two raised rib channel waveguides 44 and 46. The crossing angle of the waveguides 44 and 46 can be varied in order to change the splitting ratio of optic signals traveling therethrough.

The cross sections of FIGS. 4 and 5 show the construction of the switch 40 as obtained by the silicon-on-insulator approach. FIG. 4 shows active region 42 whereas FIG. 5 shows waveguides 44 and 46 at a location away from common area 42.

The switch 40 is built upon a silicon substrate layer 48 on which is formed a localized dielectric layer 50. A silicon layer of n-type material 54 is formed into the waveguides 44 and 46 and the active junction area 42. The raised rib structures are delineated using photolithographic techniques and dry plasma etching. The dielectric layer 50 provides the cladding which confines optic signals to waveguides 44 and 46. As discussed above with reference to the phase modulator of FIG. 1, the dielectric 50 is cut back in regions 52 and 53 (FIG. 4) away from the electrooptically active areas in order to allow current flow from the substrate 48 to silicon layer 54.

A passivating layer 56 is deposited upon silicon layer 54 in order to passivate the waveguides and the active junction at the common area 42. A p+ layer, or region, 58 is formed by boron diffusion on top of the junction area. An Ohmic contact 60 is formed on top of the junction and a second Ohmic contact 62 is formed at the base of the substrate. Since current flow is allowed between the substrate and waveguide layer 54, a full circuit can be completed between the p+ and n doped regions. The p-n junction contacts 60 and 62 are therefore connected to a current source 63. Hole injection from this forward biased p+/n junction supplies excess carries for active switching.

Electrooptical interactions are induced by actively altering the refractive index profile under the p+/n junction at the waveguide junction common area 42. The refractive index is decreased in this region with the injection of carriers. For example, the refractive index change near the junction is estimated to be $1.5 \times 10^{-3}$ for $10^{18}$ cm$^{-3}$ for holes. However, for adequate interaction between the optical signal and the index pertubation, these carriers should fill a significant volume of the waveguide intersection.

The $2 \times 2$ switching devices of FIGS. 3–10 operate on the principle of two-mode interference. The region (42) where the two waveguides merge, can support two modes, an antisymmetric and a symmetric mode. (The input (44a, 46a) and output (44b, 46b) waveguides are single-moded.) The p-n junction control region covers the entire width of the 2-mode region, and thereby affects the symmetric mode preferentially. (The antisymmetric mode is not strongly perturbed). When actuated sufficiently, the carrier refraction produces a 180° relative phase shift between the 2 modes over a distance L. This causes the mode interference pattern to shift from a maximum at a first output-guide to a maximum of a second output-guide, i.e. total switching occurs.

The waveguides of the FIG. 3 embodiment have been fabricated in 6.0 microns thick n-type crystalline silicon epitaxial layers grown upon degenerate n+ type silicon substrates. These raised rib structure devices have been tested, and forward bias junction currents as low as 600 A/cm$^2$ result in partial $2 \times 2$ switching of a few percent of the optical energy into the cross channel. Higher current densities give stronger switching and full $2 \times 2$ switching is expected with 2-mode devices. The device is bidirectional in nature, therefore, signals may be launched or received from any of the four ports 70, 72, 74 and 76. It is also possible to perform mode modulation with this device wherein some excited modes can be extinguished while others are enhanced.

Figure 6:
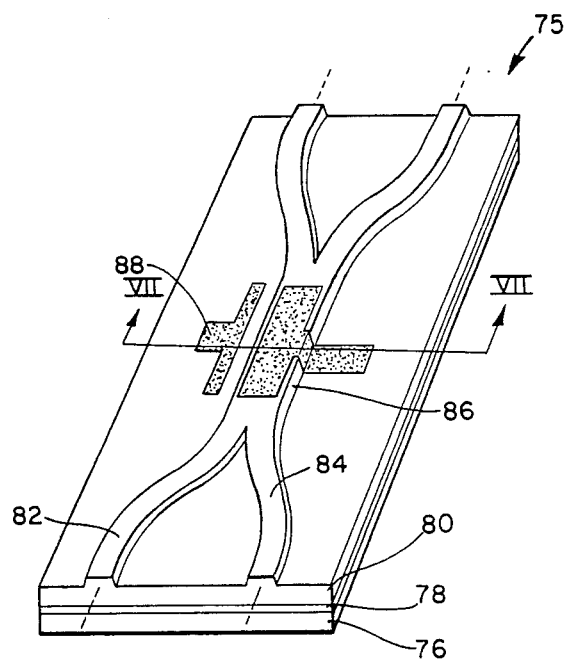
FIG. 6 is a perspective representation of another embodiment of an electrooptic switch.
Figure 7:
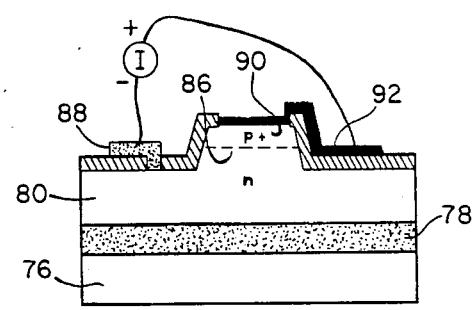
FIG. 7 is a cross section of the electrooptic switch taken along line VII—VII of FIG. 6.

FIGS. 6 and 7 show a second embodiment of the electrooptic switch 75 which is similar to the embodiment shown in FIG. 3. The electrooptic switch 75 has a silicon substrate 76 upon which is formed a dielectric layer 78 and a top crystalline silicon layer 80. Top Layer 80 is formed into waveguides 82 and 84 which have an active common area region 86. The dielectric layer 78 runs uninterrupted through the chip except where interruptions are provided to stimulate the growth of top silicon layer 80; this contrasts with the cutback dielectric layer 50 of device 40. As a result of this slight change in design, the n-doped silicon waveguide layer 80 may not be able to receive sufficient current flow from the substrate 76. A surface Ohmic contact 88 is therefore mounted directly to the n doped silicon waveguide layer adjacent to active crossing region 86. A p+ doped region 90 (FIG. 7) has been boron diffused on the top of the waveguide and which is also contacted by a surface mount Ohmic contact 92. Layers 86 and 90 therefore form the p-n junction used to operate the switch. Operationally, the switch of FIGS. 6 and 7 is equivalent to the switch of FIG. 3, but represents the design flexibility of these devices for large integrated electrooptic circuits.

Figure 8:
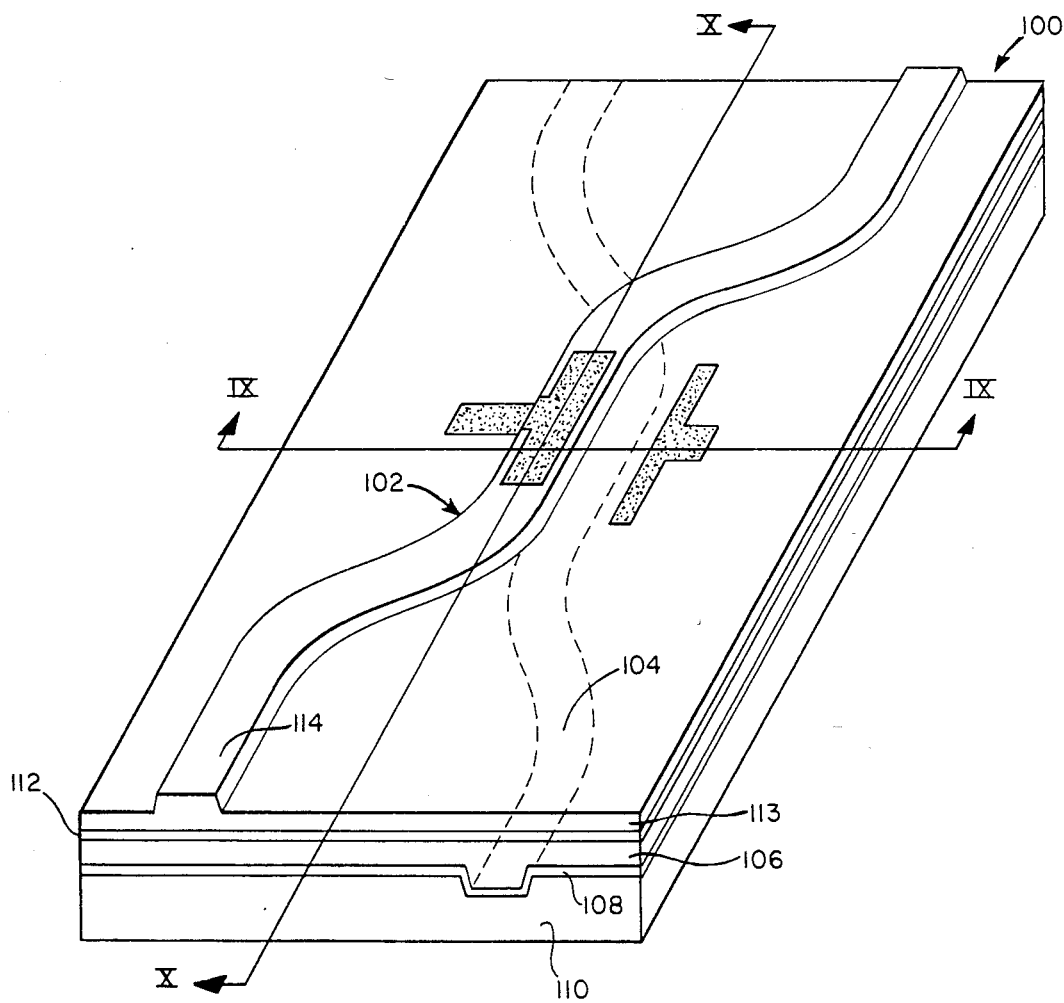
FIG. 8 is a perspective representation of an electrooptical switch with three dimensional integration.

Yet a further example of an electrooptic switch can be found in FIGS. 8 through 10 which show a guided wave device with three dimensional integration. A 2×2 electrooptic switch 100 is provided with a coupled out-of-plane crossover region 102.

A first waveguide layer 106 of crystalline silicon is deposited/grown upon a dielectric layer 108 formed on a previously etched substrate silicon layer 110. A first channel waveguide 104 is thereby formed in the lower silicon waveguide layer 106. A second dielectric layer 112 is formed upon the first silicon waveguide layer 106, on top of which a second crystalline silicon layer 113 is formed into a out of plane waveguide 114.

Each of these waveguides (104, 114) include bends so that the guides run parallel to each other (vertically) in the active crossover region 102. In this example, the active region of the parallel waveguides is about 200 microns in length. At the active region, (FIG. 10) the second dielectric layer 112 is removed, so that the waveguide channels 104, 114 merge and provide a single waveguide area 116 with a height double the height of the individual waveguides. This double height region 116 can support multiple optical modes. For single mode dimensions, however, the merger regions will support only the two lowest order modes (symmetric and antisymmetric). Although the second dielectric layer 112 has a tapered thickness (FIG. 10) as it approaches the merged area 116, it is necessary to maintain a dielectric a thickness of at least 1 micron optically to isolate the guides over the decoupled regions.

The active common region 102 is shown in greatest detail in the cross section of FIG. 9. The central area 116a of the combined silicon waveguide layers is composed of n-doped material. Two p doped regions (120 and 122) are formed at the top of each of the waveguides by diffusion at the appropriate time during chip deposition. Ohmic contacts 124 and 126 are included to each of the p-doped regions 120, 122. Note that Ohmic contact 126 is connected to region 120 by standard mesa techniques. The p doped region 120 is exposed by etchants and contacted directly by contact 126. A surface contact 128 is also provided for electrical connection to n doped region 116a. These contacts are selectively connected to a current source in order to operate the device according to the principles of selective phase shifting of modes and mode interference.

This device, however, is slightly more complex than the in-plane 2×2 electrooptical switches disclosed in FIGS. 4 and 6. It is provided with a p-n-p junction which may require more complex control in order to selectively direct optical signals or modes into the upper or lower waveguides (104, 114). The device however provides a useful method of integrating chips three dimensionally and may provide ports (interconnects) between layered integrated structures. The fabrication of this device is relatively simple if the silicon-on-insulator techniques of the above referenced related application are applied. In all other respects this switch is similar to the electrooptic phase modulator and the previously described switches.

Figure 11:
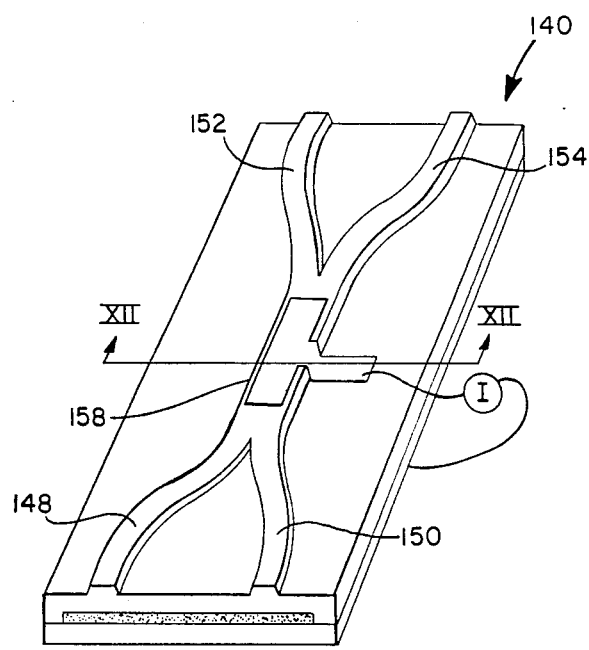
FIG. 11 a schematic of an electooptic switch which utilizes selective reflection.
Figure 12:
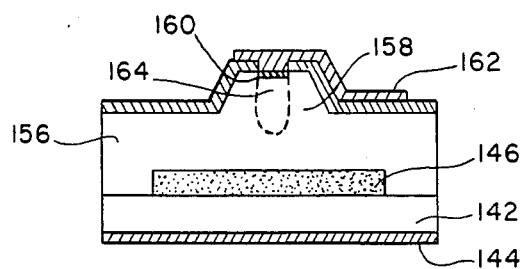
FIG. 12 is a cross section of the switch of FIG. 11 taken across line XII—XII of FIG. 11.

FIGS. 11 and 12 show an electrooptic switch 140 which accomplishes switching by selective reflection of optical signals. The switch 140 comprises a silicon substrate 142 having an Ohmic contact 144. A dielectric layer 146 is formed up in the substrate 144 below a waveguide region. The waveguides 148, 150, 152 and 154 are formed in a top silicon layer 156 which is formed upon dielectric 146 and substrate 142. The substrate is preferrably $n^+$-type silicon and the waveguides are formed in n-type silicon.

The waveguides join at a common intersection 158 which is preferably about twice the width of the individual waveguides. The waveguide pairs 148, 150, 152, and 154 diverge from the intersection 158 at about a 6° to 9° angle. Formed in the center of the intersection is a stripe of $p^+$-type material 160. The stripe has an exagerated width in the view of Figure 12 and perferably is only about 10% of the width of the intersection. The p-type stripe is connected to surface Ohmic contact 162.

The $p^+$ stripe is electrically connected such that under forward bias holes or electrons are injected into the central region of the intersection 158. These injected carriers form a thin vertical reflective wall 164 from top to bottom of the intersection 158 and act as a variable mirror to incoming optical signals. In the "on" state optical signals are reflected or diverted to a cross channel (for example, from guide 148 to guide 152). In the "off" state optical signals pass straight through the intersection 158 (for example, from guide 148 to guide 154).

A wide variety of electrooptic structures operating in the preferred 1.3—1.6 micron region are shown or implied by the above discussion. All such devices are constructed from silicon and can be readily integrated with conventional silicon electronic structures, silicon waveguides and silicon fiber optics. These devices, therefore, can bridge the gap between optic structures and conventional electronics.

While the invention has been particularly described with reference to the preferred embodiments thereof, it will be understood by those skilled in the art that various changes in substance and form can be made therein without having departed from the spirit and the scope of the invention as detailed in the attached claims. For example, $n^+$-p-$p^+$ operation is feasible as well as $p^+$—n-$n^+$ operation.

I claim:

1. An electrooptic phase modulator comprising:
   (a) a silicon substrate;
   (b) an insulating dielectric layer positioned upon said silicon substrate;
   (c) a crystalline silicon layer deposited upon said dielectric layer, said crystalline silicon layer formed into a waveguide for the transmission of light;
   (d) a first doped region forming a part of said crystalline silicon layer adjacent to said waveguide;
   (e) a second doped region forming a part of said crystalline silicon layer adjacent to said waveguide and differently doped than said first doped region;
   (f) a passivating layer substantially covering said crystalline silicon layer;
   (g) a first electrical contact connected to said first doped region layer; and
   (h) a second electrical contact electrically connected to said second doped region wherein connection of said electrical contacts to an electric voltage source affects the phase of light transmitted through said waveguide.

2. The electroopic phase modulator of claim 1 wherein said first doped region comprises $p^+$ material and said second doped region comprises n-typed material.

3. The electrooptic phase modulator of claim 1 wherein said dielectric layer is interrupted away from the vicinity of said waveguide to permit electric current flow between said substrate and said crystalline silicon layer.

4. The electrooptic phase modulator of claim 1 wherein said crystalline silicon layer comprises primarily n-type material.

5. The electrooptic phase modulator of claim 4 wherein said substrate comprises n+ type material.

6. The electrooptic phase modulator of claim 1 wherein the dielectric layer comprises silicon dioxide.

7. An electrooptic switch comprising:
(a) a silicon substrate;
(b) a dielectric layer deposited upon said silicon substrate;
(c) a crystalline silicon layer deposited upon said dielectric layer, said crystalline silicon layer formed into two diverging waveguides having a common area which comprises an n-type region and a p-type region.
(d) a passivating layer substantially covering said crystalline silicon layer;
(e) a first contact electrically connected to said n-type region of said waveguide common area; and
(f) a second contact electrically connected to said p-type region, said first and second electric contacts for providing an electric current through said switch in order to direct light traveling through said waveguide common area.

8. The electrooptic switch of claim 7 wherein said crystalline silicon layer comprises an n doped region and a p+ doped region at said waveguide common area.

9. The electrooptic switch of claim 9 wherein said dielectric layer is interrupted at a location removed from said waveguide in order to permit electric current flow between said substrate and said crystalline silicon layer.

10. The electrooptic switch of claim 7 wherein said first contact is physically connected to said silicon substrate.

11. The electrooptic switch of claim 7 wherein said second contact is a surface contact physically connected to said n doped region.

12. The electrooptic switch of claim 7 wherein said waveguides converge to a common area then diverge after said common area and wherein an optical signal entering from one of said diverging waveguides may be shifted electrooptically to pass predominently in either of said diverging waveguides.

13. An electrooptic switch comprising
(a) a silicon substrate;
(b) a dielectric layer deposited upon said silicon substrate;
(c) a crystalline silicon layer deposited upon said dielectric layer, said crystalline silicon layer comprising two dissimilar doped regions and two diverging waveguides having a common area;
(d) a passivating layer substantially covering said crystalline silicon layer;
(e) a first contact electrically connected to said waveguide common area; and
(f) a second contact electrically connected to said crystalline silicon layer adjacent to said common area, said first and second electric contacts for providing a current through said switch in order to divide light traveling through said waveguide common area between said two diverging waveguides.

14. An electroptical switch comprising:
(a) a substrate;
(b) a first dielectric layer deposited on said substrate;
(c) a first silicon layer deposited on said first dielectric layer, said first silicon layer forming a first waveguide for light transmission;
(d) a second dielectric layer deposited on said first silicon layer for containing said first waveguide;
(e) a second silicon layer deposited on said second dielectric layer, said second silicon layer forming a second waveguide for the transmission of light;
(f) a passivating layer covering said second silicon
(g) a crossover region wherein said second waveguide passes over said first waveguide and said second dielectric layer is deleted;
(h) a doped p-type region positioned at said crossover region which is electrically connected to a contact; and
(i) a waveguide contact for completing circuits between said doped p-type region and said first and second waveguides in order to direct the transfer of light therebetween.

15. The electrooptical switch of claim 14 wherein first and second silicon layers comprise n-type regions.

16. The electrooptical switch of claim 14 wherein said doped p-typed region comprises two p+ doped areas positioned in said first waveguide and said second waveguide.

17. The electrooptical switch of claim 14 wherein said crossover region is capable of sustaining multiple light phases.

18. The electrooptical switch of claim 14 wherein said dielectric layers comprise silicon oxide.

19. An electrooptic switch comprising:
(a) a silicon substrate;
(b) a dielectric layer deposited upon said silicon substrate;
(c) a crystalline silicon layer deposited upon said dielectric layer, said crystalline silicon layer formed into two diverging waveguides having a common area which comprises an n-type region and a p-type region, said p type region forming a variable mirror for selectively diverting optical signals;
(d) a passivating layer substantially covering said crystalline silicon layer;
(e) a first contact electrically covering said n-type region of said waveguide common area; and
(f) a second contact electrically connected to said p-type region, said first and second electric contacts for providing an electric current through said switch in order to selectively divert light traveling through said waveguide common area.

* * * * *